UNITED STATES PATENT OFFICE.

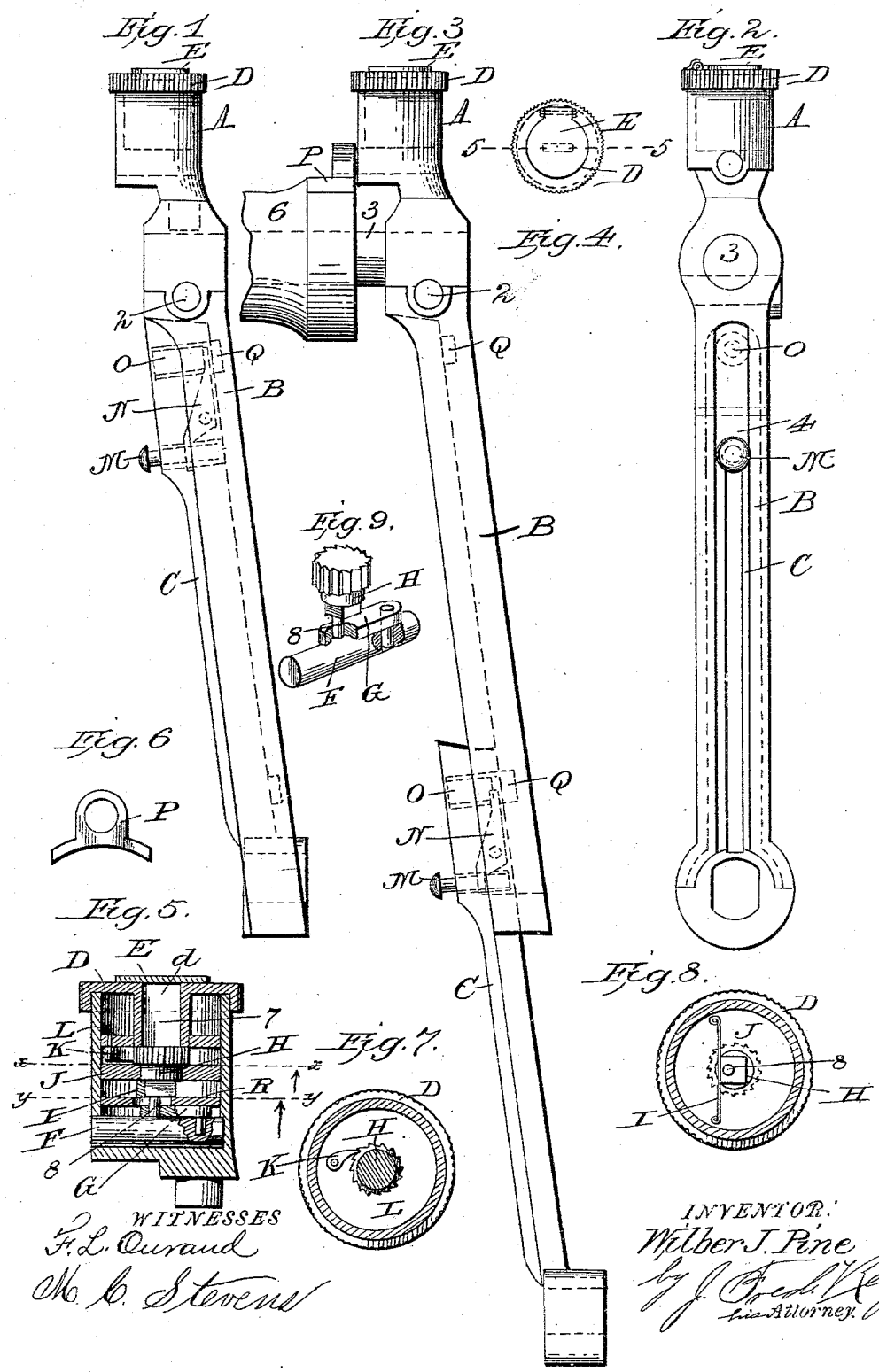

WILBER J. PINE, OF OSHKOSH, WISCONSIN.

BICYCLE.

SPECIFICATION forming part of Letters Patent No. 551,401, dated December 17, 1895.

Application filed November 5, 1894. Serial No. 527,968. (No model.)

*To all whom it may concern:*

Be it known that I, WILBER J. PINE, a citizen of the United States, residing at Oshkosh, in the county of Winnebago and State of Wisconsin, have invented certain new and useful Improvements in Bicycles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain new and useful improvements in bicycles, whereby a support is provided to hold the machine in an upright position when left standing, and whereby the bicycle can be locked so as to prevent the same being ridden off by unauthorized persons.

The improvement consists of an extensible crank which forms the support, and a lock for securing the crank in the located position, all as more fully set forth hereinafter and claimed.

In the drawings, Figure 1 is a side view of a bicycle-crank embodying the invention. Fig. 2 is a rear view in elevation of the crank. Fig. 3 is a side view showing the crank extended and locked. Fig. 4 is a top plan view of the lock. Fig. 5 is a section of the lock on the line 5 5 of Fig. 4. Fig. 6 is a front view of the keeper provided on the frame to receive the lock-bolt. Figs. 7 and 8 are cross-sections taken on the planes indicated by lines $x\,x$ and $y\,y$ of Fig. 5, respectively, looking upward. Fig. 9 is a detail view showing the tumbler H, its pin 8, the arm G, and the locking-bolt F.

The crank is extensible and is composed of the parts B and C. The part B is attached to the pedal-shaft 3 in the usual manner by means of the key 2. The part C is movable and slides in a groove 4 in the part B, the edges of the said groove being undercut to retain the slidable part C in place. A spring-actuated catch O carried by the part C is adapted to engage with either of the two notches Q, one near each end of the part C, to secure the slidable part C in a reduced or projected position, as required. A push-pin M operated upon by a spring has connection with a lever N and is adapted to be pressed upon when it is desired to actuate the catch O. The push-pin makes connection with one end of the lever N and the catch O has connection with its opposite end. When the slidable part C is pushed in, the crank presents the usual appearance of the ordinary crank and is equally as strong, because the interlocking slidable joint between the meeting faces of the parts mutually strengthens and braces them.

The lock A is formed with or attached to the crank and its locking-bolt F is constructed to engage with a part of the frame of the machine and secure the crank in the required position. A keeper P is provided on the frame 6 of the machine to receive the locking-bolt when projected and fasten the crank in the located position. The cap D, closing the upper end of the lock-case, has a keyhole $d$ and a milled edge by means of which a firm grip may be had upon the said cap when turning it to lock the crank. A spring-actuated cover E closes the keyhole $d$ and excludes dirt, wet and foreign matter from the interior of the lock. A plate L within the lock-case is attached by a tubular extension 7 with the cap and carries a pawl K for operating in conjunction with a rotatable tumbler H to project the bolt F. This tumbler H is circular and provided on its exterior surface with ratchet-teeth which are engaged by the pawl K when rotating the cap D in one direction only. To withdraw the bolt F after it is projected it is necessary to insert a key through the opening $d$ so as to make positive connection with the tumbler H. The tumbler is mounted in a plate J and has two flat sides at its lower end which are engaged by a flat spring I, by means of which the tumbler and the locking-bolt are held in either of their two positions. This spring I is attached to the plate J and holds the locking-bolt in either a projected or retracted position. An eccentrically-disposed pin 8 pendent from the tumbler engages with an arm G, by means of which the locking-bolt is operated. The tumbler is supported upon the bottom R of the lock-case.

When propelling the machine the locking-bolt is drawn within the case and the part C of the crank is moved to the utmost limit of its inward movement. When the machine is left standing it is supported in an upright position by lengthening the crank until the part C is drawn out to the limit of its movement and its lower end rests upon the ground. By rotating the cap D the locking-bolt is projected and fastens the crank in the required position.

It will be understood that the locking mechanism may be applied to any form of crank and that the extensible crank may be used independently of the lock; but it is preferred to use the two jointly as a means of supporting and securing the machine when left standing. Moreover, the lock secures the support in the proper position and prevents its accidental displacement by a slight movement of the machine.

Having thus described my invention, what I claim as new, and desire to secure by Letters Patent, is—

1. A bicycle lock comprising a locking bolt, a rotatable tumbler having a ratchet portion, and a hand operated part provided with a pawl to take into the ratchet teeth and turn the tumbler so as to project the locking bolt, said tumbler and hand operated part being constructed to receive a key whereby both will turn as one part to withdraw the locking bolt, substantially as specified.

2. In a bicycle lock, the combination of a case open at one end, a locking bolt, a rotary tumbler operatively connected with the locking bolt and having a ratchet portion, a cap closing the open end of the case and adapted to be rotated in either direction by hand, and having a pendent tubular portion terminating in a plate, and a pawl attached to the said plate, the cap and the rotary tumbler being constructed to receive a key whereby they are caused to move together to withdraw the locking bolt, substantially as described.

3. A crank for a manually propelled machine having a case formed on the end opposite the pedal, a locking bolt operating laterally through the case, a rotary tumbler operatively connected with the locking bolt and having a ratchet portion and flat sides, a flat spring to bear laterally on the flat sides and hold the locking bolt in either position, a rotatable cap closing the open end of the case and having a key opening, a pawl operatively connected with the cap and adapted to engage with the ratchet portion of the tumbler being constructed to receive a key whereby the two are caused to move together to withdraw the locking bolt, and a spring actuated cover for closing the key hole in the cap, substantially as described.

4. A crank for a bicycle adapted to be lengthened and touch the ground and support the machine in an upright position, substantially as described.

5. A bicycle crank having a slidable part which is adapted to be extended to support the machine, and a catch to secure the movable part in either of its two positions as set forth.

In testimony whereof I affix my signature in presence of two witnesses.

WILBER J. PINE.

Witnesses:
OLOF. T. OHON,
W. M. PRICE.